United States Patent
Macdonald

(10) Patent No.: US 12,066,451 B2
(45) Date of Patent: Aug. 20, 2024

(54) VIBRATING METER WITH GAP

(71) Applicant: MICRO MOTION, INC., Boulder, CO (US)

(72) Inventor: George Alexander Macdonald, Wokingham (GB)

(73) Assignee: MICRO MOTION, INC., Boulder, CO (US)

( * ) Notice: Subject to any disclaimer, the term of this patent is extended or adjusted under 35 U.S.C. 154(b) by 386 days.

(21) Appl. No.: 17/435,316

(22) PCT Filed: Mar. 25, 2019

(86) PCT No.: PCT/US2019/023851
§ 371 (c)(1),
(2) Date: Aug. 31, 2021

(87) PCT Pub. No.: WO2020/197543
PCT Pub. Date: Oct. 1, 2020

(65) Prior Publication Data
US 2022/0136946 A1 May 5, 2022

(51) Int. Cl.
*G01N 9/00* (2006.01)
*G01N 11/16* (2006.01)
(52) U.S. Cl.
CPC ............ *G01N 9/002* (2013.01); *G01N 11/16* (2013.01); *G01N 2009/006* (2013.01)
(58) Field of Classification Search
CPC ... G01N 9/002; G01N 11/16; G01N 2009/006
See application file for complete search history.

(56) References Cited

U.S. PATENT DOCUMENTS

| | | | |
|---|---|---|---|
| 4,526,480 A | 7/1985 | Ward | |
| 4,644,803 A * | 2/1987 | Ward | G01N 9/002 177/208 |

(Continued)

FOREIGN PATENT DOCUMENTS

| | | |
|---|---|---|
| CN | 108474685 A | 8/2018 |
| WO | 9802725 A1 | 1/1998 |
| WO | 2013174958 A1 | 11/2013 |

OTHER PUBLICATIONS

Li, Chengzhang et al, Investigation of Air Damping and Q in A Mems Resonant Mass Sensor, Department of Mechanical Engineering—Engineering Mechanics, Michigan Technological University, Houghton, Michigan, USA, Conference Proceeding, 2008, ASPE Annual Meeting.

*Primary Examiner* — Tarun Sinha
(74) *Attorney, Agent, or Firm* — The Ollila Law Group LLC

(57) ABSTRACT

A vibrating meter comprises a vibrating element with a longitudinal direction and a cross-sectional area in a plane perpendicular to the longitudinal direction. The vibrating element moves between a first position and a second position in a plane perpendicular to the longitudinal direction of the vibrating element. An electronics is operable to drive the vibrating element between the first position and the second position. A boundary element and the vibrating element define a fluid velocity boosting gap having an average gap distance between the boundary element and the vibrating element. The vibrating element includes a gap-facing perimeter section facing the fluid velocity boosting gap having a gap perimeter length. In embodiments, a ratio of the gap perimeter length to the average gap distance is at least 160. In further embodiments, the average gap distance is 0.25 mm or less.

26 Claims, 11 Drawing Sheets

(56) References Cited

U.S. PATENT DOCUMENTS

| | | |
|---|---|---|
| 5,607,236 A | 3/1997 | Takagi et al. |
| 2010/0170327 A1 | 7/2010 | Glauner et al. |
| 2011/0129929 A1* | 6/2011 | Day .................. G01N 9/36 |
| | | 422/82.01 |
| 2013/0104649 A1 | 5/2013 | Oikawa et al. |
| 2015/0114137 A1 | 4/2015 | Putty et al. |

* cited by examiner

VIBRATING METER WITH GAP

TECHNICAL FIELD

The embodiments described below relate to vibratory meters and, more particularly, to density and viscosity meters.

BACKGROUND

Vibrating meters, including densitometers and viscometers, are important tools used to measure a density or a viscosity of a fluid. Vibrating meters may comprise a vibrating element, such as a fork, a cylinder, or a planar resonator, etc. that is exposed to a fluid under test. One example of a vibrating meter comprises a cylinder cantilever mounted with an inlet end coupled to an existing pipeline or other structure and the outlet end free to vibrate. The cylinder can be vibrated at resonance and the resonant response frequency can be measured. The density of the fluid under test can be determined by measuring the reduced response frequency of the vibrating element. According to well-known principles, the resonant frequency of the vibrating element will vary inversely with the density of the fluid that contacts the conduit.

FIG. 1 depicts a prior art vibrating meter 100. Vibrating meter 100 may be configured to measure a density of a fluid, such as a liquid or a gas, for example. Vibrating meter 100 includes a housing 102 with a vibrating element 104 located at least partially within the housing 102. Housing 102 helps to retain the fluid pressure as vibrating element 104 oscillates. A portion of housing 102 is cut away to show a vibrating element 104. In examples, vibrating meter 100 may be placed in-line in an existing pipeline. In further examples, however, the housing 102 may comprise closed ends with apertures to receive a fluid sample. Therefore, while flanges are not shown, in many instances, housing 102 or vibrating element 104 may include flanges or other members for operatively coupling vibrating meter 100 to a pipeline or similar fluid delivering device in a fluid-tight manner. In the example of vibrating meter 100, vibrating element 104 is cantilever mounted to housing 102 at first end 106. Vibrating element 104 is free to vibrate at a second end 108.

Example vibrating meter 100 is immersive, meaning that the fluid under measurement is found all around vibrating element 104. According to the example shown, the vibrating element 104 may include a plurality of fluid apertures 110 near the first end 106. The fluid apertures 110 can be provided to allow some of the fluid entering the vibrating meter 100 to flow between the housing 102 and the vibrating element 104. In other examples, apertures may be provided in the housing 102 to expose the fluid under test to the outer surface of the vibrating element 104. In further examples, however, fluid may enter the vibrating meter through channels in the metal work near the first end 106. The fluid may flow along the longitudinal length between the housing 102 and vibrating element 104 to the second end 108, where it may then flow back towards the first end 106 via the interior of vibrating element 104. In this way, the fluid may contact the inside as well as the outside surfaces of the vibrating element 104. This is helpful when the fluid under test comprises a gas because a greater surface area is exposed to the gas.

Further shown in FIG. 1 is a driver 112 and a vibrating sensor 114 positioned within a cylinder 116. The driver 112 and vibrating sensor 114 are depicted as comprising coils, but other implementations are also possible. If an electric current is provided to the coil, a magnetic field is induced in the vibrating element 104 causing the vibrating element 104 to vibrate. Conversely, the vibration of the vibrating element 104 induces a voltage in the vibrating sensor 114. The driver 112 receives a drive signal from a meter electronics 118 in order to vibrate the vibrating element 104 at one of its resonant frequencies in one of a plurality of vibration modes, including for example simple bending, torsional, radial, or coupled type. The vibrating sensor 114 detects the vibration of the vibrating element 104, including the frequency at which the vibrating element 104 is vibrating and sends the vibration information to the meter electronics 118 for processing. As the vibrating element 104 vibrates, the fluid contacting the vibrating element's wall, and the fluid a short distance from the cylinder will vibrate along with the vibrating element 104. The added mass of the fluid contacting the vibrating element 104 lowers the resonant frequency. The new, lower, resonant frequency of the vibrating element 104 is used to determine the density of the fluid. The resonance response, or the quality factor, may also be used to determine the viscosity of the fluid.

In the example vibrating meter 100, density sensitivity and viscosity sensitivity can be unsuitable when the fluid under measure has a low density or a low viscosity, such as, for example, when the fluid is a gas. One prior solution to this problem is to make the wall thickness of vibrating element 104 thinner and therefore, lighter. This makes vibrating element 104 more difficult to manufacture, however, and less robust because it may be more easily damaged.

What is needed is a vibrating meter that has higher density sensitivity and/or lower viscosity sensitivity when measuring low density fluids.

SUMMARY

In a first embodiment, a vibrating meter is provided. The vibrating meter comprises: a vibrating element comprising a longitudinal direction and a cross-sectional area in a plane perpendicular to the longitudinal direction, the vibrating element moving between a first position and a second position in the plane perpendicular to the longitudinal direction; a boundary element adjacent to the vibrating element; and an electronics operable to drive the vibrating element between the first position and the second position, wherein the boundary element and the vibrating element define a fluid velocity boosting gap in the plane perpendicular to the longitudinal direction, the fluid velocity boosting gap having an average gap distance between the boundary element and the vibrating element when the vibrating element is in a neutral position, the vibrating element having a gap-facing perimeter section around the cross-sectional area of the plane facing the fluid velocity boosting gap having a gap perimeter length, and a ratio of the gap perimeter length to the average gap distance is at least 160.

In a second embodiment, a vibrating meter is provided. The vibrating meter comprises: a vibrating element comprising a longitudinal direction and a cross-sectional area in a plane perpendicular to the longitudinal direction, the vibrating element moving between a first position and a second position in the plane perpendicular to the longitudinal direction; a boundary element adjacent to the vibrating element; and an electronics operable to drive the vibrating element between the first position and the second position, wherein the boundary element and the vibrating element define a fluid velocity boosting gap in the plane perpendicular to the longitudinal direction, the fluid velocity boosting gap having an average gap distance between the boundary element and the vibrating element when the vibrating element is in a neutral position, the average gap distance being 0.25 mm or less.

In a third embodiment, a method of determining a viscosity or a density of a fluid using the vibrating meter as defined by the first or second embodiments is provided. The method comprises driving the vibrating element between the first position and the second position using a driver and an electronics; and determining a natural frequency of the vibrating element using a sensor and the electronics.

In a fourth embodiment, a method for assembling the vibrating meter according to the first or second embodiment is provided. The method comprises: providing the vibrating element; providing the boundary element; coupling the boundary element adjacent to the vibrating element to define the fluid velocity boosting gap; and coupling the electronics to the vibrating meter.

ASPECTS

According to an aspect, the average gap distance may be 0.2 mm or less.

According to an aspect, the vibrating element may be a first tine and the boundary element may be a housing.

According to an aspect, the vibrating element may be a first tine and the boundary element may be a second tine.

According to an aspect, the vibrating element may be a cylinder.

According to an aspect, the vibrating element may be a planar resonator.

According to an aspect, a density sensitivity of the vibrating meter may be greater than 1400 ns/kg/m3 when the fluid is a gas.

According to an aspect, a viscosity sensitivity may be greater than $1.949 \times 10^{-7}$ μPa·s when the fluid is a gas.

According to an aspect, the average gap distance may be 0.2 mm or less.

According to an aspect, the vibrating element may be a first tine and the boundary element may be a housing.

According to an aspect, the vibrating element may be a first tine and the boundary element may be a second tine.

According to an aspect, the vibrating element may be a cylinder.

According to an aspect, the vibrating element may be a planar resonator.

According to an aspect, a density sensitivity of the vibrating meter may be greater than 1400 ns/kg/m3 when the fluid is a gas.

According to an aspect, a viscosity sensitivity may be greater than $1.949 \times 10^{-7}$ μPa·s when the fluid is a gas.

According to an aspect, a driving frequency at which the vibrating element may be driven between the first position and the second position is below 600 Hz.

According to an aspect, the average gap distance may be 0.2 mm or less.

According to an aspect, the vibrating element may be a first tine and the boundary element may be a housing.

According to an aspect, the vibrating element may be a first tine and the boundary element may be a second tine.

According to an aspect, the vibrating element may be a cylinder.

According to an aspect, the vibrating element may be a planar resonator.

According to an aspect, a density sensitivity of the vibrating meter may be greater than 1400 ns/kg/m3 when the fluid is a gas.

According to an aspect, a viscosity sensitivity may be greater than $1.949 \times 10^{-7}$ μPa·s when the fluid is a gas.

BRIEF DESCRIPTION OF THE DRAWINGS

The same reference number represents the same element on all drawings. It should be understood that the drawings are not necessarily to scale.

DETAILED DESCRIPTION

FIGS. 2-12 and the following description depict specific examples to teach those skilled in the art how to make and use the best mode of embodiments of a vibrating meter. For the purpose of teaching inventive principles, some conventional aspects have been simplified or omitted. Those skilled in the art will appreciate variations from these examples that fall within the scope of the present description. Those skilled in the art will appreciate that the features described below may be combined in various ways to form multiple variations of the vibrating meter. As a result, the embodiments described below are not limited to the specific examples described below, but only by the claims and their equivalents.

Figure 1:
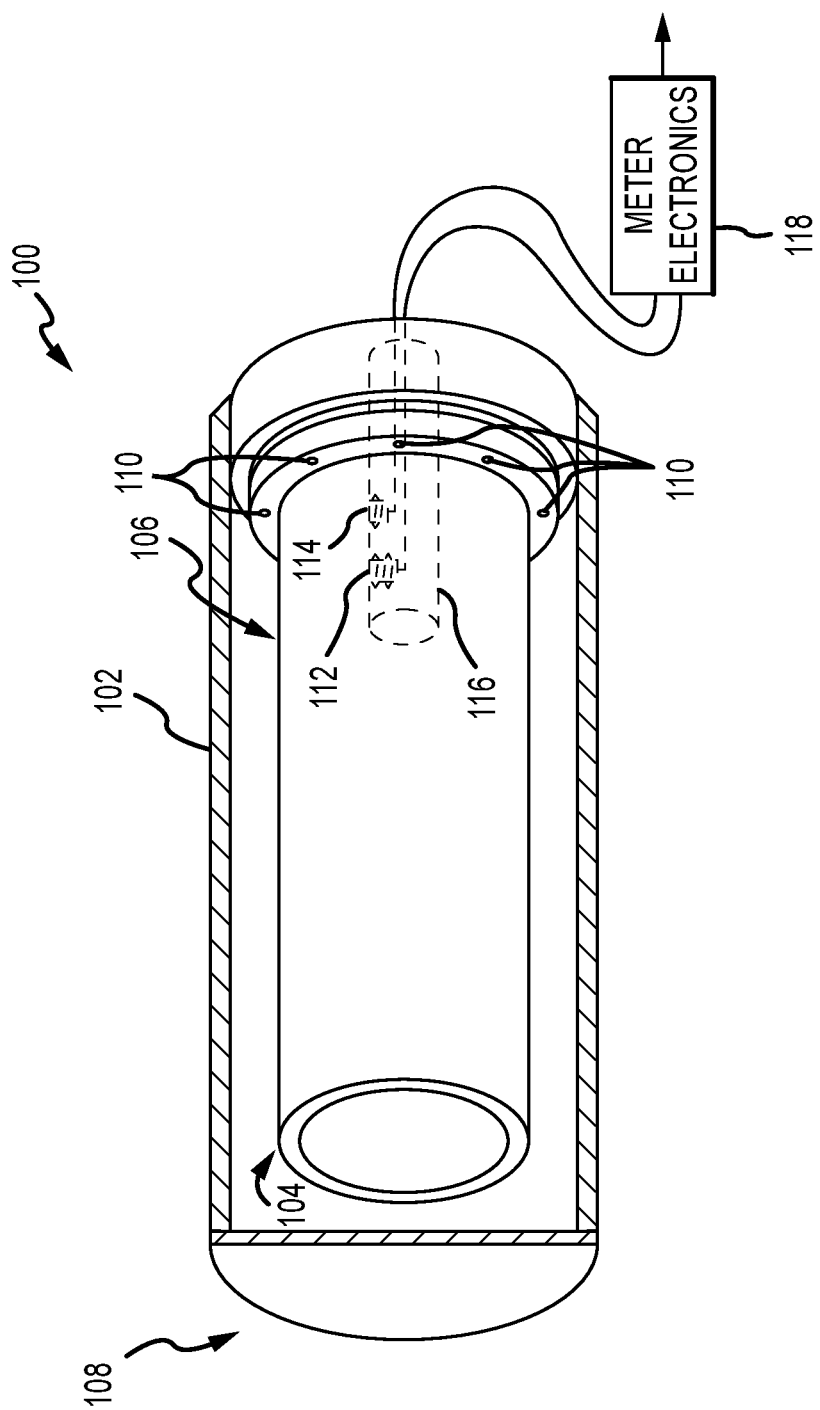
FIG. 1 depicts a prior art vibrating meter 100.
Figure 2:
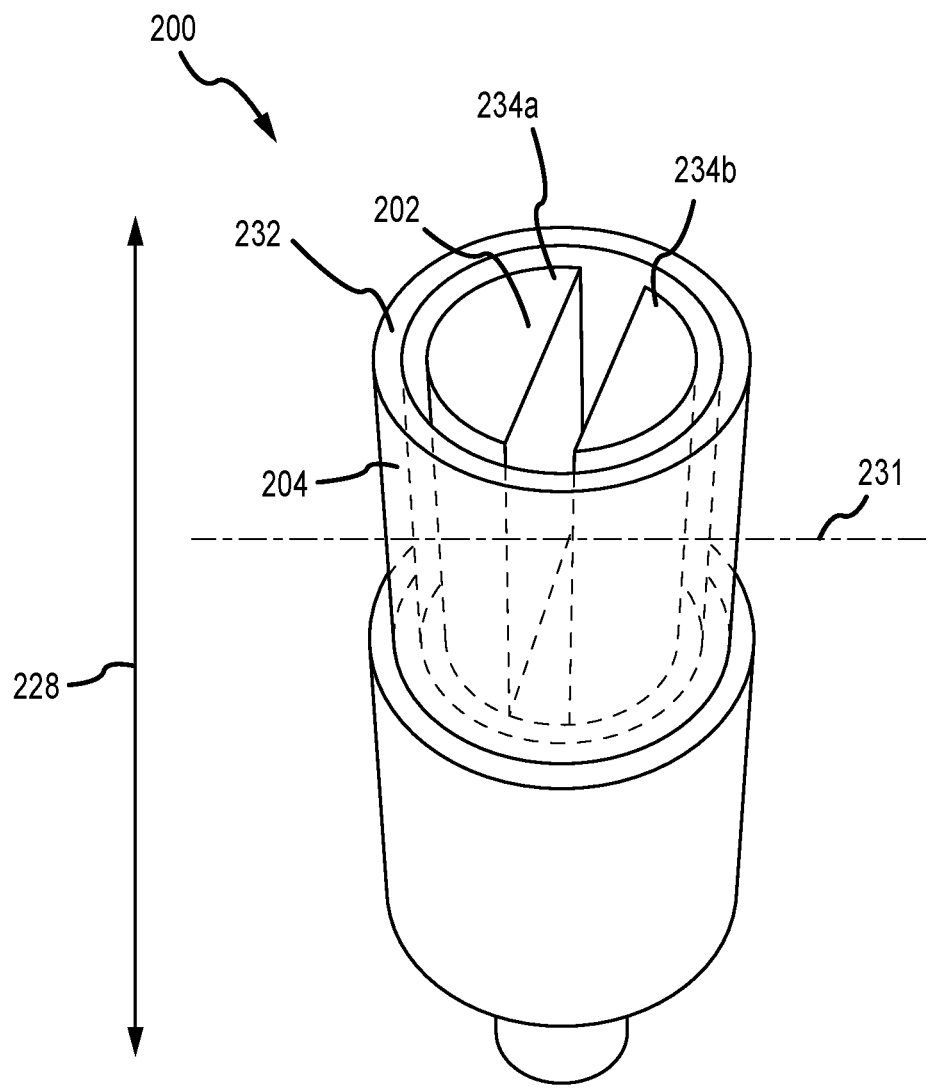
FIG. 2 depicts vibrating meter 200, in accordance with an embodiment.
Figure 3A:
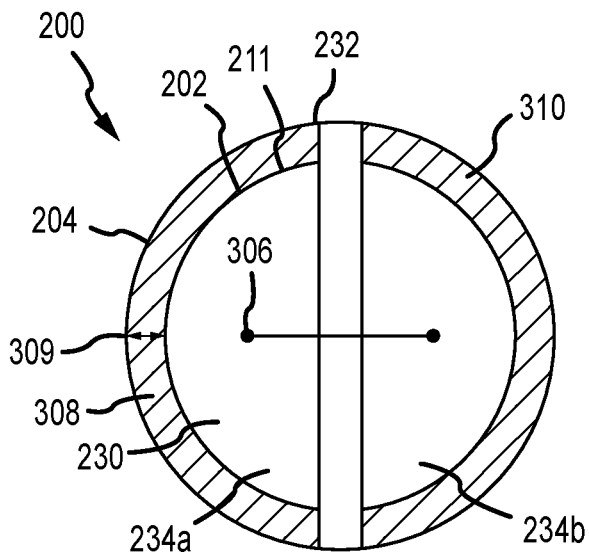
FIG. 3A depicts vibrating meter 200, in accordance with an embodiment.
Figure 3B:
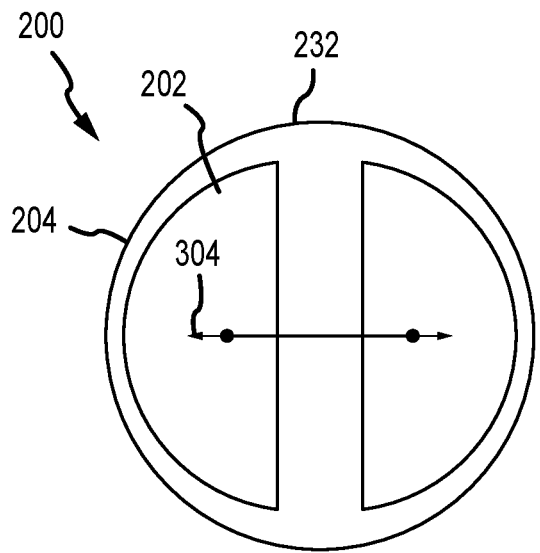
FIG. 3B depicts vibrating meter 200, in accordance with an embodiment.
Figure 3C:
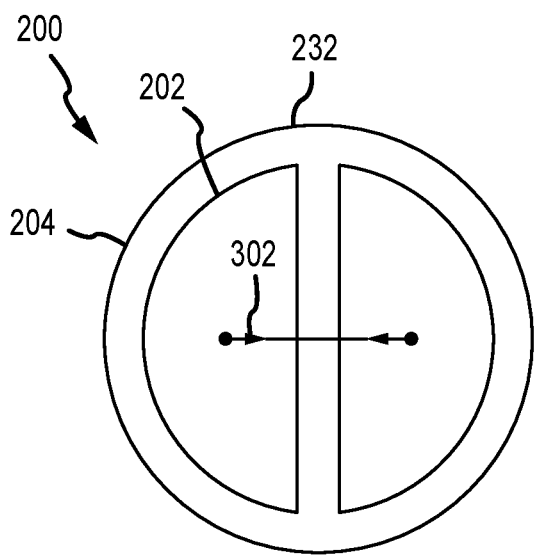
FIG. 3C depicts vibrating meter 200, in accordance with an embodiment.

FIG. 2 depicts a perspective cutaway view of vibrating meter 200, in accordance with an embodiment. FIGS. 3A, 3B, and 3C depict cross sectional views of vibrating meter 200 taken at the line marked 231 in FIG. 2. Vibrating meter 200 includes a vibrating element 202, a housing 204, a boundary element 232, and a meter electronics (not depicted). Vibrating meter 200 may further comprise a driver, a sensor, one or more apertures, and other features, but these features are not depicted to simplify the figure.

Vibrating element 202 comprises a longitudinal direction 228 and a cross-sectional area 230 in a plane 231 perpendicular to the longitudinal direction 228. In the example of vibrating meter 200, vibrating element 202 includes at least one of two fork tines with a partial-circular cross-sectional area 230. In examples, cross-sectional area 230 may be semi-circular. In further examples, however, cross-sectional area 230 may comprise a perimeter that includes a minor segment of a circle.

In further embodiments, however, vibrating element 202 may comprise a fork tine with a different shape, however. For example, vibrating element 202 may comprise one or more tines comprising a substantially planar shape. In some examples, the substantially planar shape may comprise the cross section formed between two parallel cords of a circle.

Figure 4A:
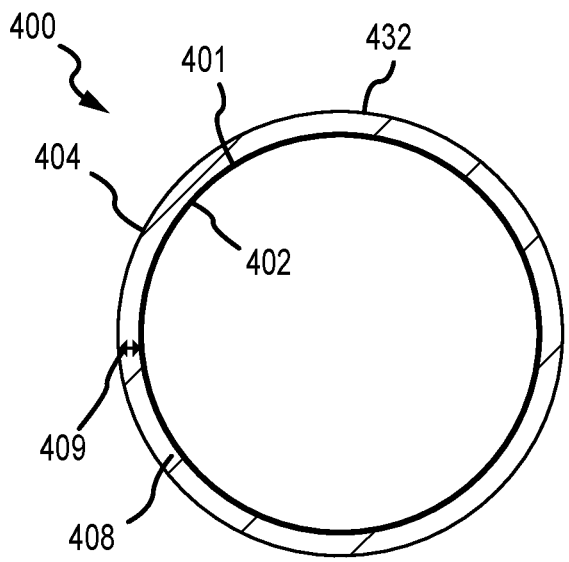
FIG. 4A depicts vibrating meter 400, in accordance with an embodiment.

In further embodiments, the vibrating element may not comprise one or more fork tines. For example, FIG. 4A depicts cross sectional views of vibrating meter 400, in accordance with an embodiment. Vibrating meter 400 includes a vibrating member 402, and housing 404. Vibrating member 402 and housing 404 each comprise a cylindrical shape, much like in vibrating meter 100.

Figure 5A:
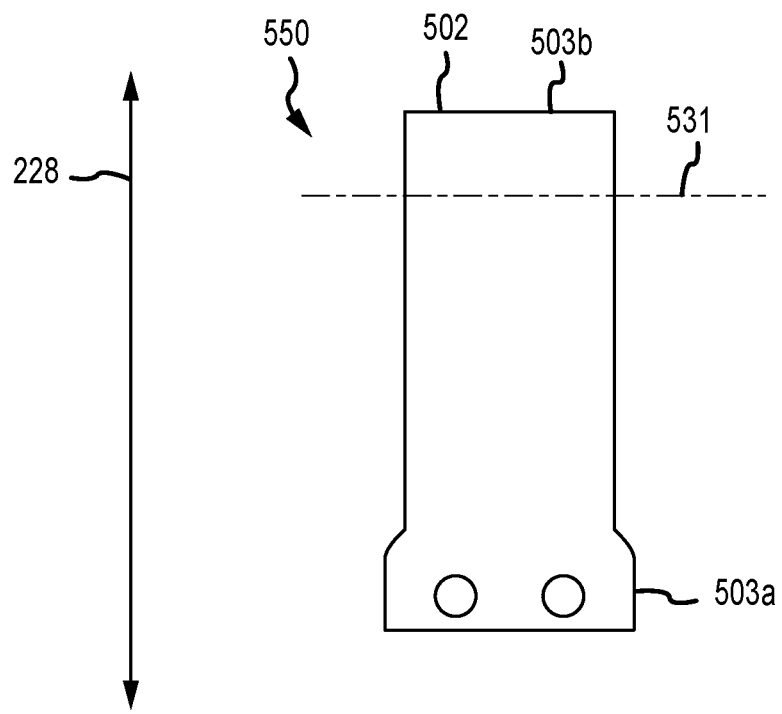
FIG. 5A depicts a vibrating member 502, in accordance with an embodiment.
Figure 5B:
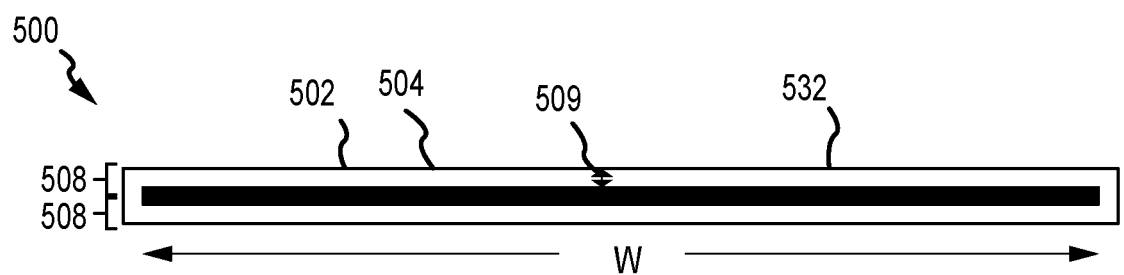
FIG. 5B depicts a planar resonator 550, in accordance with an embodiment.

In further embodiments, the vibrating element may instead comprise a planar resonator. For example, FIG. 5A depicts a top view of planar resonator 550, which comprises vibrating element 502, and FIG. 5B depicts a cross-sectional view of a vibrating meter 500 taken in the plane 531 perpendicular to the longitudinal direction 228, marked by a line with double arrows in FIG. 5A.

Vibrating meter 500 comprises planar resonator 550 vibrating element 502 and a housing 504. Vibrating element 502 is substantially flat and may be coupled to vibrating meter 500 at a coupled end 503a (coupling not shown), and free to vibrate at an oscillating end 503b when driven. In examples, oscillating end 503b may further comprise one or more paddle sections that oscillate together or move in opposition to one another, as will be understood by those of skill.

Other embodiments of vibrating element 202 are also possible, as will be understood by those of skill.

Returning to FIGS. 3A-3C, it may be seen that vibrating element 202 oscillates between a first position 302 and a second position 304 in the plane 231 perpendicular to the longitudinal direction 228. FIGS. 3A, 3B, and 3C depict vibrating meter 200 with vibrating element 202 in different positions. FIG. 3B depicts vibrating element 202 in second position 304, a position of maximum separation between the fork tines, and FIG. 3C depicts vibrating element 202 in first position 302, a position of minimum separation between the fork tines. FIG. 3A depicts vibrating element 202 in a neutral or resting position 306, or the position that vibrating element 202 is in when it is not being driven to oscillate.

Vibrating meter 200 includes a boundary element 232 adjacent to the vibrating element. Boundary element 232 provides a boundary for the fluid between the boundary element 232 and vibrating element 202 in a cross-sectional area in a plane 231 perpendicular to the longitudinal direction 228 of the vibrating element 202. Vibrating element 202 oscillates towards and away from the boundary element 232 so that the distance between the vibrating element 202 and the boundary element 232 changes with the oscillation of the vibrating element.

In the embodiment of vibrating meter 200, the boundary element 232 is a cylindrical housing member 204 that surrounds the outer semi-circular contours of vibrating element 202. In further embodiments, however, a boundary element may comprise different shapes. For example, vibrating meter 500 includes a boundary element 532 that is a rectangular housing member 504. In further examples, a boundary element may comprise a second tine of vibrating element 202, as will be further described below.

When vibrating element 202 oscillates, fluid will move in and out of the region between vibrating element 202 and boundary element 232. In prior vibrating meters, the distance between a vibrating element and any boundary elements was so large that the mean velocity of the fluid moving around a vibrating element in response to the oscillations was low. By contrast, boundary element 232 and vibrating element 202 define a fluid velocity boosting gap 308 in the plane 231 perpendicular to the longitudinal direction 228. Fluid velocity boosting gap 308 is configured to be narrow enough to substantially increase the mean velocity of the fluid when the vibrating element is oscillating, as will be further explained below. For example, as may be seen in FIG. 3A, fluid velocity boosting gap 308 comprises a C-shaped cross-sectional area between the arcs of vibrating element 202 and housing 204.

In further examples comprising differently configured vibrating elements and housings, the fluid velocity boosting gap 308 may comprise other shapes, however. For example, vibrating meter 400 includes a fluid velocity boosting gap 408 that forms an annular shape all the way around cylindrical vibrating element 402. Contrarily, vibrating meter 500 includes a fluid velocity boosting gap 508 that comprises a rectangle above and below vibrating member 502.

Fluid velocity boosting gap 308, 408, 508 has an average gap distance 309, 409, 509 between the boundary element 232, 432, 532 and the vibrating element 202, 402, 502 when the vibrating element 202, 402, 502 is in a neutral position. For example, as may be seen from FIG. 3A, where vibrating meter 200 is in a neutral position, the average gap distance 309 may be determined by averaging the distance between the closest points of the adjacent arc segments of vibrating element 202 and housing 204. In examples, the average gap distance 309 along the fluid velocity boosting gap 308, 408, 508 may have a low standard deviation. In other words, the distance between vibrating element 202, 402, 502 and boundary element 232, 432, 532 may be substantially the same.

In examples, fluid velocity boosting gap 308, 408, 508 may surround a portion of, or the entire perimeter of vibrating element 202, 402, 502.

In the example where the vibrating element 202 comprises two tines, the fluid velocity boosting gap 308 may further comprise a second region around the second tine, marked 310 in FIG. 3A.

Vibrating element 202, 402, 502 includes a gap-facing perimeter section around the cross-sectional area 230 of the plane 231 facing the fluid velocity boosting gap 308, 408, 508 having a gap perimeter length.

For example, in the embodiment of FIG. 3A, the partially circular exterior of vibrating element 202 facing fluid velocity boosting gap 308 comprises gap-facing perimeter section 211. The gap perimeter length is the length of the gap-facing perimeter section. In the example of FIG. 3A, the gap perimeter length is equal to the length of the minor arc that comprises gap-facing perimeter section 211.

In further examples, however, the gap-facing perimeter section may take different shapes. For example, in the embodiment of vibrating meter 400, a gap-facing perimeter section 411 may comprise the entire circumference of cylindrical vibrating member 402. And in the embodiment of vibrating meter 500, the gap-facing perimeter may comprise the perimeter along the width W of vibrating element 502, along both of the longer sides that face housing element 504.

In prior embodiments, the size of a gap between a vibrating element and a boundary element was 0.5 mm or greater. For the example embodiment with vibrating element 202 comprising a fork, a typical tine diameter is 25.4 mm, corresponding to a gap perimeter length of approximately 40 mm. Prior fork vibrating meters therefore included in a ratio of gap perimeter length to average gap distance of 80. For the example embodiment where vibrating element 402 comprises a cylinder, however, typical cylinder diameter is 20 mm, corresponding to a gap perimeter length of approximately 63 mm. Prior cylinder vibrating meters therefore included a ratio of gap perimeter length to average gap distance of 125.

In embodiments of the Application, a ratio of the gap perimeter length to the average gap distance is at least 160. For example, for a tine-style vibrating element 202 with a diameter of 25.4 mm and a gap size of 0.25 mm, a ratio of gap perimeter length to average gap distance is approximately 160. For a cylinder-style vibrating element 402 with a diameter of 20 mm and a gap size of 0.25 mm, a ratio of gap perimeter length to average gap distance is approximately 251.

Vibrating meter 200 further comprises an electronics operable to drive the vibrating element between the first position 302 and the second position 304, the vibrating element being closer to the boundary element 232 in second position than in the first position. In the case where the vibrating element is a cylinder or a planar resonator, electronics 118 may drive the vibrating element back and forth. In the case where vibrating element 202 is a fork, however, there may be two tines (as depicted in FIGS. 2, 3A, 3B, and 3C), however. Electronics 118 may therefore, along with a driver, move the tines in opposition to one another, as depicted in FIGS. 3A, 3B, and 3C.

For natural, or unforced resonators, behavior can be described by Equation 1 below:

$$\omega \propto \sqrt{\frac{K}{M}} \qquad \text{(Equation 1)}$$

where $\omega$ is the resonance frequency, K is the effective stiffness, and M is the effective mass. When operating at relatively low frequencies, such as at or below 600 Hz, or at or below 500 Hz, depending on the geometry, the fluid around a vibrating element may not contribute any stiffness to the resonator. Displacement of the fluid may contribute some mass, however, and therefore the resonance frequency co decreases as the density of the fluid increases.

Figure 6:
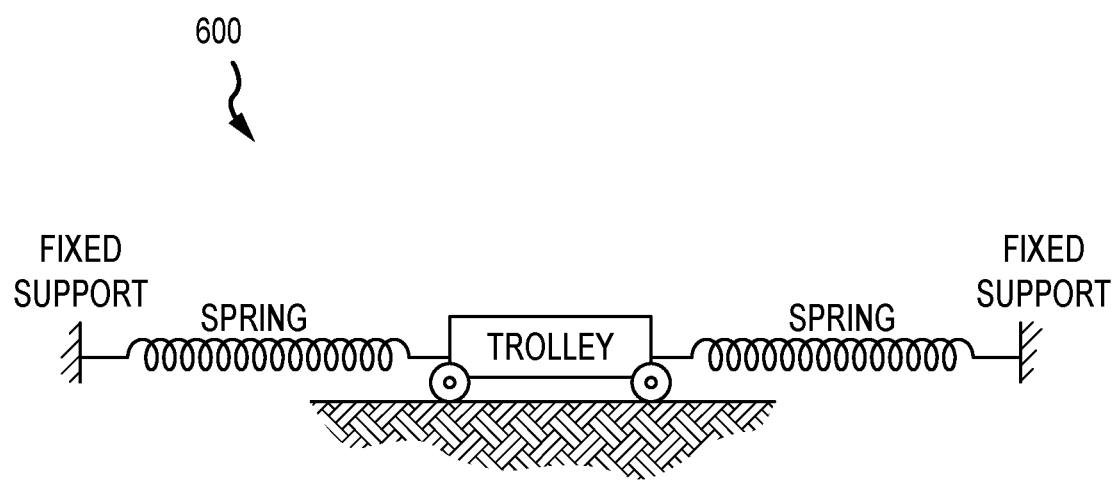
FIG. 6 depicts a frictionless spring and mass trolley system 600, in accordance with an embodiment.

Equation 1 is derivable by considering the forces on a frictionless spring and mass trolley system 600 depicted by FIG. 6. If system 600 is not driven, for example, because the frictionless oscillation of the trolley has been initiated with no interference from external forces, the compression of the spring may provide a driving force that results in acceleration of the mass. The motion of system 600 may therefore be represented by Equation 2:

$$kx + m\ddot{x} = 0 \qquad \text{(Equation 2)}$$

where x is the displacement of the trolley, $\ddot{x}$ is the acceleration of the trolley, k is the stiffness of the springs and m is the mass of the trolley. When the solution to Equation 2 is x=A sin($\omega$t), Equation 2 reduces to Equation 1.

Equation 1 is also derivable by assuming that the total energy in the oscillating spring mass arrangement of frictionless spring and mass trolley system 600 remains constant with time, which is the case when the arrangement is frictionless. In such a case, frictionless spring and mass trolley system 600 will provide a periodic transfer from 100% potential energy when the strain in the spring is maximum and the velocity of the mass is zero to 100% kinetic energy where the velocity is a maximum and the strain in the spring is zero.

Between the endpoint phase of the trolley oscillation where the energy is 100% kinetic, let the phase $\omega$t=0, for example, and the endpoint phase where the energy is 100% potential, let the phase $\omega$t=90, for example, there will be a phase $\omega$t=45 where the kinetic energy will equal the potential energy. Equation 3 represents the phase $\omega$t=45 of trolley displacement where the kinetic energy and the potential energy are equal:

$$\tfrac{1}{2}kx^2 = \tfrac{1}{2}mv^2, \qquad \text{(Equation 3)}$$

where k is a spring constant, x is a distance, m is a mass, and v is velocity. If x=A sin($\omega$t) and v=A$\omega$ cos($\omega$t), where A is the maximum displacement of an oscillating mass, and $\omega$ is the resonance frequency, then Equation 3 reduces to Equation 1.

In a vibrating meter, the energy of the movement of the fluid must be considered in addition to the vibrating element, however. When a fluid has no stiffness, as in the case with a gas, it contributes nothing to the potential energy. In the application of a vibrating meter, Equation 3 applies as follows:

$$\tfrac{1}{2}mv^2 + \tfrac{1}{2}m_{fluid}v_{fluid}^2 = \tfrac{1}{2}kx^2 \qquad \text{(Equation 4)}$$

where m is the mass of the vibrating element, v is the velocity of the vibrating element, $m_{fluid}$ is the mass of the fluid, $v_{fluid}$ is the velocity of the fluid, k is the spring constant of the vibrating element, and x is the displacement of the vibrating element. If x=A sin($\omega$t) and v=A$\omega$ cos($\omega$t), where A is the maximum displacement of vibrating element 202, then vibrating meter 200 may be described by:

$$\tfrac{1}{2}m(1+\delta)(v(1+\gamma))^2 = \tfrac{1}{2}kx^2, \qquad \text{(Equation 5)}$$

with $\delta$ being the ratio of the mass of the fluid $m_{fluid}$ to the mass m of the vibrating element. As those of skill will readily understand, ratio $\delta$ depends also on the density of the fluid, the density of the vibrating element, and the geometry of both. Similarly, $\gamma$ is the ratio of the velocity of the fluid $v_{fluid}$ to the velocity of the vibrating element v. Equation 5 may be further re-arranged as follows:

$$(1+\delta)(1+\gamma)^2 = \frac{kx^2}{mv^2}. \qquad \text{(Equation 6)}$$

If x=A sin($\omega$t), v=A$\omega$ cos($\omega$t), and Z=(1+$\delta$)(1+$\gamma$)$^2$, then:

$$Z = \frac{kx^2}{mv^2} = \frac{kA^2(\sin\omega t)^2}{mA^2\omega^2(\cos\omega t)^2}. \qquad \text{(Equation 7)}$$

When $\omega$t equals 45 degrees (kinetic energy equals potential energy), the following frequency relationship applies:

$$\omega = \sqrt{\frac{k}{Zm}}$$ (Equation 8)

where Zm is the effective mass of the vibrating element 202 and the fluid. Effective mass Zm depends on the gap size.

As may be understood via Equation 8, by increasing the effective mass Zm of the system, it may be possible to decrease the resonant frequency of the vibrating meter.

The viscosity sensitivity is a measure of how much damping there is in a vibrating meter. The amount of damping may depend on the displacement velocity of the fluid. The mean displacement velocity of a fluid may be increased by reducing the size of fluid velocity boosting gap 308, as is further described below.

Assuming there is no compression of the fluid, which is true if the frequency ω of the vibration is very low, then the mass of fluid $m_{fluid}$ displaced will be the same whether a boundary element 232 is positioned close to vibrating element 202, forming a narrower gap between them, or if boundary element 232 is far away from vibrating element 202, forming a wider gap. However, although the mass of fluid displaced is the same in both cases, the mean displacement velocity of a fluid is higher when the boundary element 232 is closer to the vibrating element 202, and therefore the ratio γ is also higher, for reasons described in relation to FIGS. 7A-7C below.

Figure 7A:
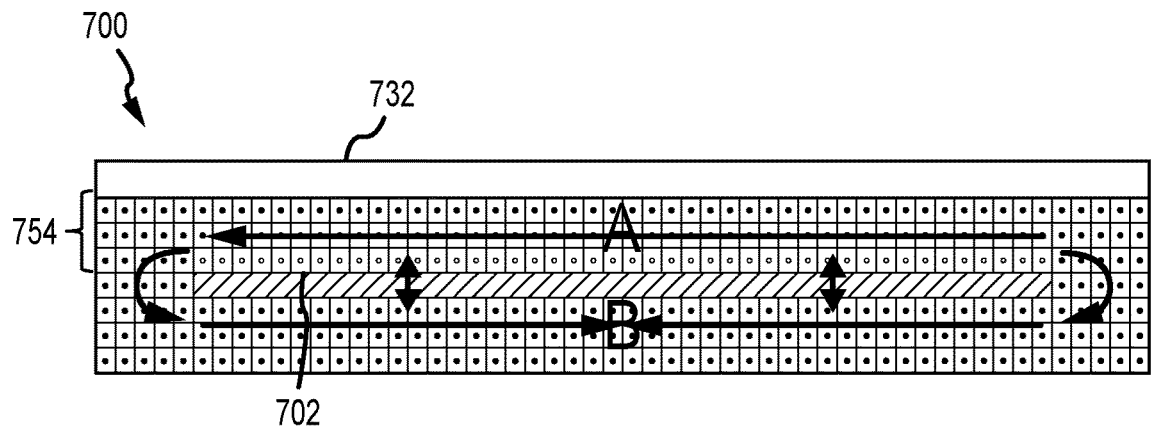
FIG. 7A depicts a vibrating meter 700, in accordance with an embodiment.

FIG. 7A represents a simplified cross-sectional area of vibrating meter 700 with a vibrating element 702 and a boundary element 732, with the cross-sectional area being perpendicular to a longitudinal direction of the vibrating meter 700. As may be seen in the cross-sectional view, vibrating element 702 and boundary element 732 are depicted as being substantially planar, with vibrating element 702 oscillating up and down with respect to boundary element 732, much like as described for vibrating meter 500. A fluid velocity boosting gap 754 is defined between boundary element 732 and vibrating element 702.

If the vibrating element 702 moves up or down any distance, even by a microscopic amount, a volume of gas in the region A will be displaced to the region B by flowing all along one length of the perimeter of vibrating element 702, around the two ends of vibrating element 702, and along a second length of the perimeter of vibrating element 702, as is indicated by the arrows in FIG. 7A. As those of skill will understand, approximately half of the fluid in the region A will travel to the left, and half will travel to the right. When the fluid is a gas, the molecules have a high kinetic energy, and the gas displacement may be distributed amongst all the gas molecules in vibrating meter 700.

Figure 7B:
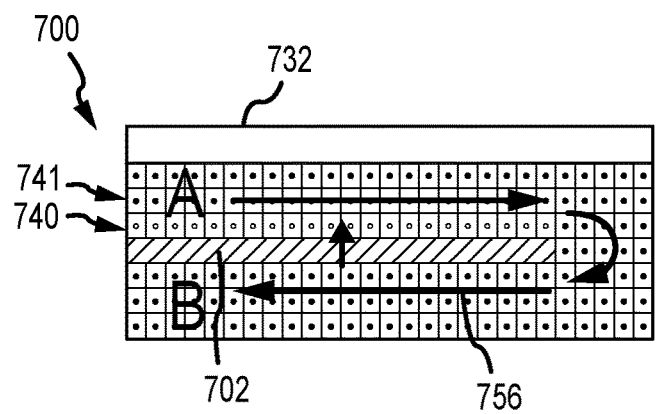
FIG. 7B depicts a vibrating meter 700, in accordance with an embodiment.
Figure 7C:
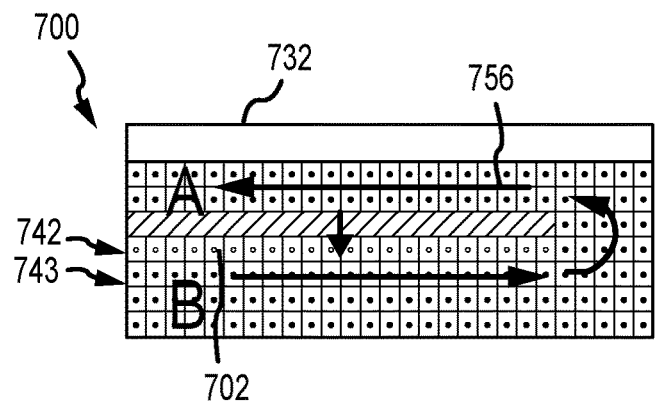
FIG. 7C depicts a vibrating meter 700, in accordance with an embodiment.

The movement of vibrating element 702 with respect to boundary element 732 is exaggerated in FIGS. 7A-7C. As those of skill will readily understand, the movement of vibrating element 702 may be very small with respect to the distance in the fluid velocity boosting gap between the vibrating element 702 and the boundary element 732. For example, the vibrating element 702 may not be visible to the naked eye and its displacement may be on the order of 1 micron or less.

Vibrating element 702 and boundary element 732 of FIGS. 7A-7C are simplified for demonstrational purposes, but those of skill will readily understand that the concepts described may apply to vibrating meters with differently shaped vibrating elements (for example, cylindrical, planar, or any shape of fork tine) and differently shaped boundary elements 732 (for example, cylindrical or oval housings, or planar tines).

For simplicity, FIGS. 7B and 7C depict only half of vibrating member 702. FIG. 7B depicts when vibrating element 702 is moving towards the second position 304, a minimum distance away from boundary element 732, and FIG. 7C represents when the vibrating element 702 is moving towards the first position 302, a maximum distance from boundary element 732.

The distance between boundary element 732 and vibrating element 702 defines a fluid velocity boosting gap 754, the length of which is described when vibrating element 702 is at rest. Example fluid velocity boosting gap 754 has a thickness of 3.5 units, and a width of 54 units. As vibrating element 702 oscillates, an area in fluid velocity boosting gap 754 of fluid equal to the change in the size of the fluid velocity boosting gap cross-sectional area, which in the example has the dimensions of 1 unit by 54 units, is displaced by vibrating element 702. This may be seen in FIG. 7B, where fluid is pushed from row 741 to row 740, and then around vibrating element 702, as depicted by the arrows. Under the kinetic theory, the displaced fluid will redistribute so that it is of substantially uniform density once again. The fluid in row 741 of FIG. 7B flows around the end of vibrating member 702 and along the underside of vibrating member 702. In FIG. 7C, vibrating member 702 moves towards the first position 302, pushing fluid from row 742 to row 743, where it may then redistribute from region B to region A.

The simplified vibrating meter 700 described with regards to FIGS. 7A-7C is intended to provide a qualitative description of why there is an increase in density and viscosity sensitivity when a gap length is reduced. In simple harmonic motion, the displacement of the fluid is cyclical and continuous, and so those of skill will understand that a velocity gradient may be present. For example, the mean fluid velocity close to the vibrating element 702 may be highest, and the mean fluid velocity may diminish as the distance from the boundary element increases.

Because the fluid must travel a long distance around the perimeter of vibrating element 702 relative to the relatively short fluid velocity boosting gap 754, the fluid will have a greater mean displacement over a vibrating meter with a longer gap distance. Similarly, the mean displacement velocity of the fluid within vibrating meter 700 will also be greater when the length of fluid velocity boosting gap 754 is substantially less than the distance around the perimeter of vibrating element 702. As the mean displacement velocity of the fluid increases, the mean kinetic energy of the fluid will also increase because kinetic energy is proportionate to velocity squared. Modeling and laboratory experiments have determined that as the gap narrows, there comes a point where gap 754 is halved, and the mean displacement velocity of the fluid between the regions A and B is approximately doubled, corresponding to a kinetic energy increase by a factor of 4.

Those of skill will also understand that the principles described above with regards to fluid traveling a relatively long distance around the perimeter of a cross-sectional area of vibrating element 702 will also apply to the longitudinal dimension of a vibrating element 702 compared to a smaller fluid velocity boosting gap 754. Therefore, in examples, a ratio of a longitudinal length of vibrating element 202, 402, 502, 702 to fluid velocity boosting gap 308, 408, 508, 754 may also be greater than 160.

Those of skill with further understand that the physics described with regards to FIGS. 7A-7C also applies to other embodiments of vibrating meter assemblies that may provide for different fluid flows.

Figure 4B:
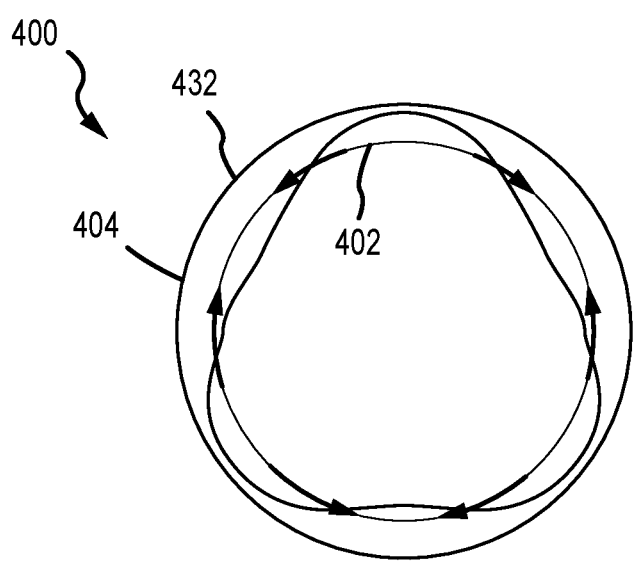
FIG. 4B depicts vibrating meter 400, in accordance with an embodiment.

For example, FIG. 4B depicts the oscillation of cylindrical vibrating element 402. In FIG. 4B, cylindrical vibrating member 402 is displaced radially at anodes, as represented by the dotted line centered on vibrating member 402. The flow of fluid during the oscillation of vibrating member 402 is represented by the arrows in FIG. 4B. By providing an average gap distance of 0.25 mm or less, or providing a ratio of gap perimeter length to average gap distance that is 160 or greater, it is possible to increase the fluid velocity around vibrating element 402.

It has been found that the mean displacement velocity of a gas is at least doubled when narrowing the fluid velocity boosting gap 754 between vibrating element 702 and a boundary element 732 from a gap size of 0.5 mm to a gap size of 0.25 mm. As those of skill will readily understand, however, this may vary based on vibrating meter geometry and what fluid is under test.

Density sensitivity is the change in resonance frequency versus fluid density and is often measured in Hz per kg/m³ or μs per kg/m³. The mean increase in the velocity of fluid provided by the narrow gap of vibrating meter 700 provides an increase in the effective mass of the fluid over vibrating meter 700, and therefore an increase in resonance frequency of the vibrating meter and the fluid combined, as provided by Equations 5-8 above.

Figure 8A:
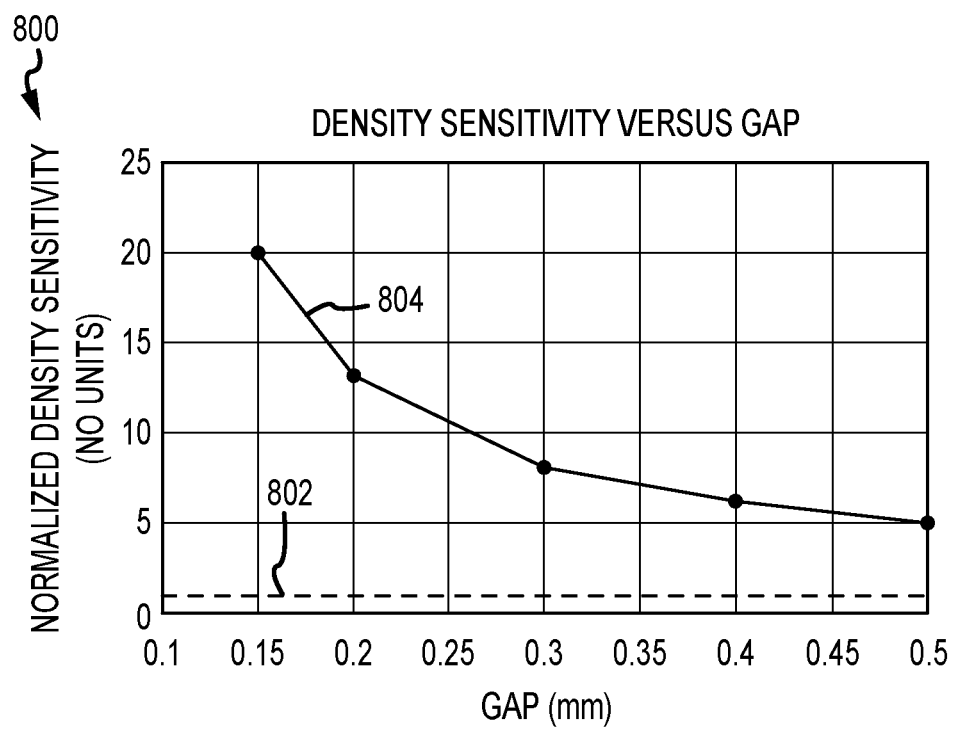
FIG. 8A depicts a chart 800, in accordance with an embodiment.

FIG. 8A depicts chart 800, the density sensitivity versus gap size. The y-axis of chart 800 is normalized density sensitivity units, and the x-axis is gap size in millimeters. A normalized density sensitivity unit is normalized with respect to a vibrating meter having a vibrating member with no boundary member, or with a boundary member that forms a gap that is so wide that there is no velocity boosting effect.

Chart 800 includes a line 802 that marks the density sensitivity when there is no boundary element, as may be the case when an immersive densitometer or viscometer has no housing, or a housing that is very large when compared to the cross-sectional width of a vibrating element, for example. Line 804 follows the experimental results of density sensitivity for different gap sizes. As may be seen from FIG. 8A, a vibrating meter with a gap size of 0.25 mm may provide an increase in density sensitivity that is 10 times greater than a vibrating meter with no boundary element, and therefore no gap. Prior vibrating meters with no boundary element have been determined to have a density sensitivity of approximately 140 ns/kg/m³. Therefore, 10 normalized density sensitivity units is equivalent to 1400 ns/kg/m³. Similarly, a vibrating meter with a gap size of 0.15 mm may provide a density sensitivity that is 20 times greater than a vibrating meter with no boundary element.

Viscosity sensitivity may be defined as the change in damping versus viscosity. One way to determine damping is to measure the broadness of a resonance peak for a vibrating meter. Conventionally this is defined by the quality factor Q, which is Q=resonance frequency/bandwidth.

For a vibrating meter measuring liquid, viscosity is roughly proportional to $1/Q^2$. The equation used determine viscosity η is:

$$\eta = V_0 + \frac{V_1}{Q^2}, \quad \text{(Equation 9)}$$

where $V_0$ and $V_1$ are calibration coefficients, and viscosity sensitivity is $V_1$. If two fluids are measured, it is possible to determine the viscosity sensitivity $V_1$ using the viscosity and Q factors measured from each fluid $$\eta_1 = V_0 + \frac{V_1}{Q_1^2} \text{ and } \eta_2 = V_0 + \frac{V_1}{Q_2^2}.$$

By solving this system of equations for viscosity sensitivity $V_1$, we arrive at Equation 10:

$$V_1 = \frac{\left(\frac{1}{Q_1^2} - \frac{1}{Q_2^2}\right)}{(\eta_1 - \eta_2)} \quad \text{(Equation 10)}$$

Equation 11 below broadly captures the relationship of viscosity η of a fluid to quality factor Q, density ρ, and the resonance frequency $\omega_0$ of a vibrating element:

$$\eta = B + \frac{A}{Q^2} \times \frac{1}{\rho \times \omega_0^3}. \quad \text{(Equation 11)}$$

When the fluid is a liquid, the final term including density p and resonance frequency $\omega_0$ may be ignored. As may be seen, the viscosity of a liquid represented by Equation 11 therefore becomes approximately the same form as the viscosity of a liquid represented by Equation 9. Therefore Equation 10 may also be a good approximation of viscosity sensitivity for a fluid.

Figure 8B:
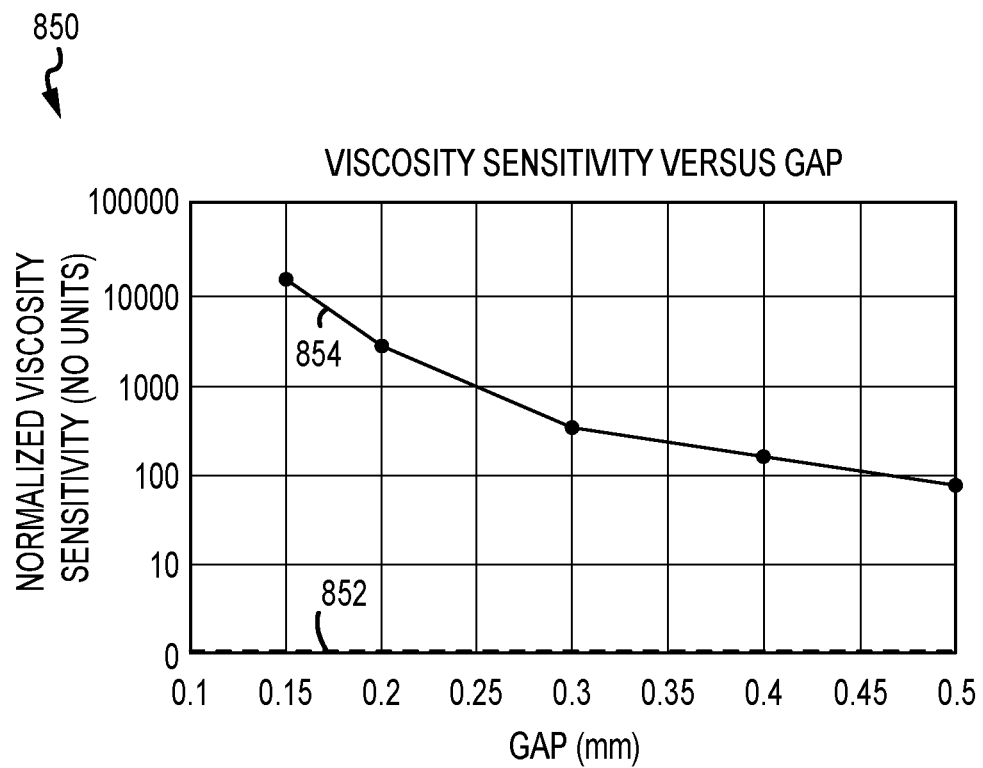
FIG. 8B depicts a chart 850, in accordance with an embodiment.

FIG. 8B depicts chart 850, depicting viscosity sensitivity versus gap size. The y-axis of chart 850 is normalized viscosity sensitivity units, and the x-axis is gap size in millimeters. A normalized viscosity sensitivity unit is normalized with respect to a vibrating meter having a vibrating member with no boundary member, or with a boundary member that forms a gap that is so wide that there is no velocity boosting effect.

Chart 850 includes a line 852 that marks the viscosity sensitivity when there is no boundary element. FIG. 8B further depicts line 854, which follows the experimental results of viscosity sensitivity for different gap sizes. As may be seen from FIG. 8B, a vibrating meter with a gap size of 0.25 mm may provide an increase in viscosity sensitivity that is over 1000 times greater than a vibrating meter with no boundary element, and therefore no gap. Prior vibrating meters with no boundary element have been determined to have a viscosity sensitivity of approximately $1.949 \times 10^{-10}$ μPa·s, so the viscosity sensitivity for the 0.25 mm gap is $1.949 \times 10^{-7}$ μPa·s. Similarly, a vibrating meter with a gap size of 0.15 mm may provide with a viscosity sensitivity that is over 16000 times greater than a vibrating meter with no boundary element.

Figure 9A:
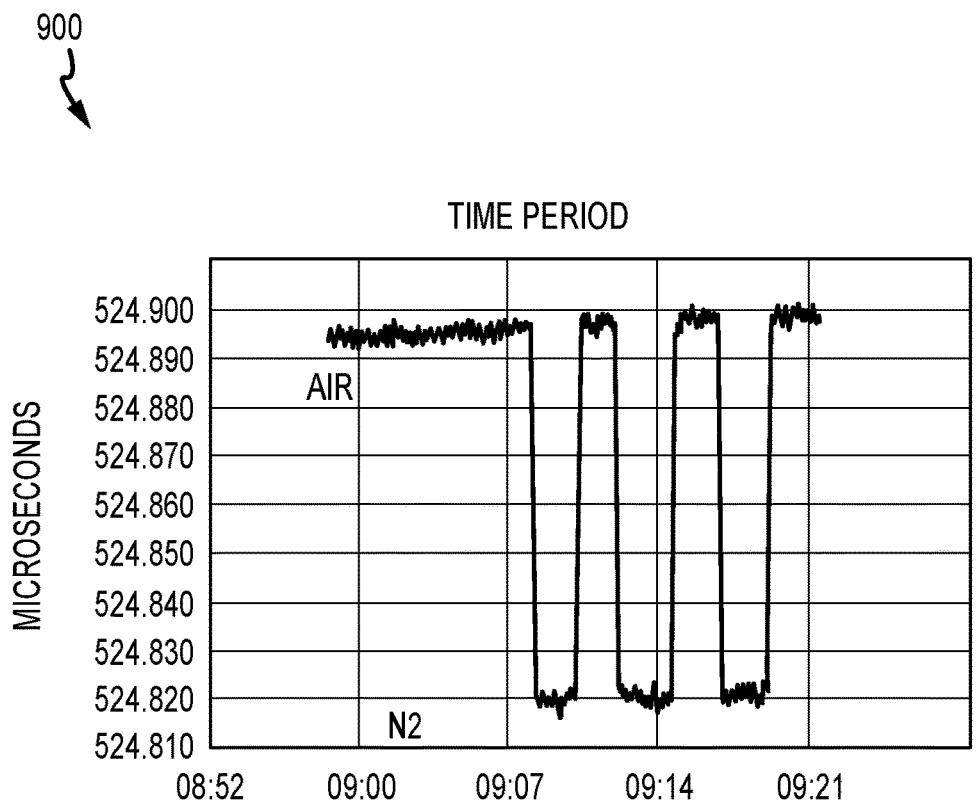
FIG. 9A depicts a chart 900, in accordance with an embodiment.
Figure 9B:
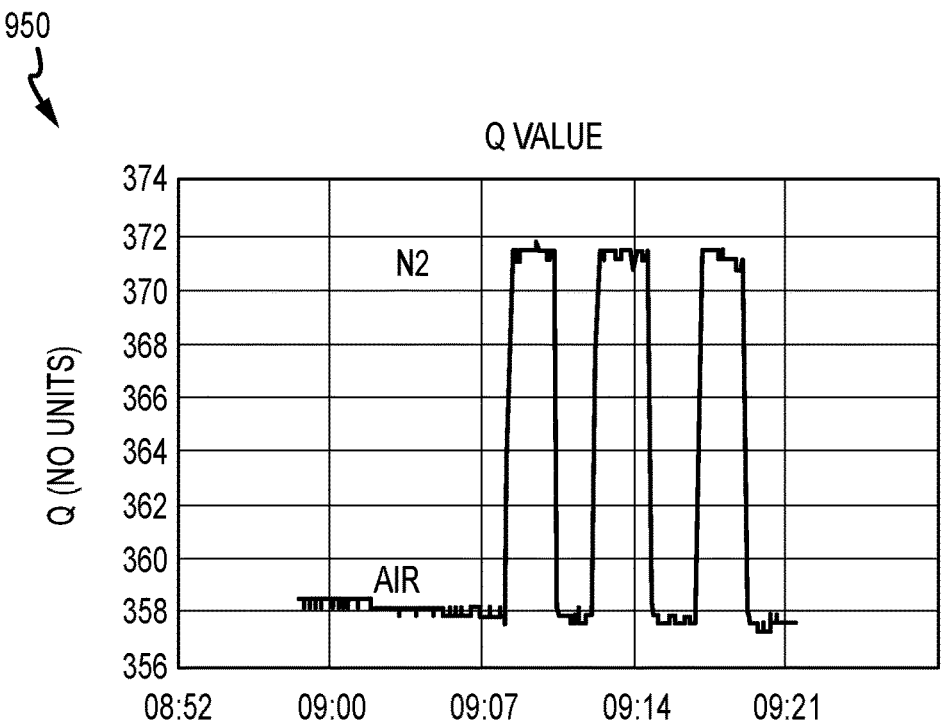
FIG. 9B depicts a chart 950, in accordance with an embodiment.

FIGS. 9A and 9B depict experimental data charts 900 and 950, which further demonstrate the effectiveness of the embodiments of the Application. Chart 900 depicts the change in time period (the inverse of frequency ω) measured using a vibrating meter as the gas under measurement switch between ambient air and nitrogen $N_2$. Like frequency ω, the time period measured is proportional to the density of the fluid under test. Prior vibrating meters could not resolve the difference between the densities of ambient air and $N_2$, but the improvements provided by the embodiments of the Application increase the density sensitivity so that the differences may now be detectable.

Chart 950 depicts the change in quality factor Q measured as the gas under measurement switches between ambient air and nitrogen $N_2$. Prior vibrating meters could not resolve the difference in quality factor Q, or viscosity between ambient air and nitrogen $N_2$. However, the improvements described in the present Application may increase the viscosity sensitivity so that the differences in quality factor Q or viscosity are now detectable.

Therefore, as may be seen, by making the fluid velocity boosting gap 308, 408, 508, 754 between a vibrating element and a boundary element narrower, the mean displacement velocity of a fluid may be increased, and the density sensitivity and the viscosity sensitivity of a vibrating meter may also be increased. There is a limit to the performance of the vibrating meter if the gap becomes too narrow, however. One reason is that it can be very difficult to manage machining tolerances for the vibrating element and boundary element. In addition, if a gap is too narrow, it can cause an unwanted pressure drop in the vibrating meter. Finally, if the gap is too narrow, particulates may build up within it, potentially causing fluid blockages. It has been observed in the lab that these problems typically do not occur if the gap size is above 0.1 mm, however.

In an embodiment, the gap may be 0.25 mm wide or less. In a further embodiment, the gap may be 0.2 mm, or 0.15 mm or less. In a further embodiment, the gap may be between 0.2 and 0.1 mm. In embodiments, the vibrating meter may move 0.1 mm between the first and second positions 302, 304. In further embodiments, however, the vibrating meter may move 1 micron or less between first and second positions 302, 304.

In embodiments, the vibrating element 202 may comprise a first tine 234a and the boundary element 232 may comprise a housing 204. For example, FIGS. 3A-3C depict vibrating meter 200 with a fork including a first tine 234a and second tine 234b. A gap 308 is defined between first tine 234a and housing 204. In examples, gap 308 may be further defined between the second tine 234b and the housing as well.

Figure 10:
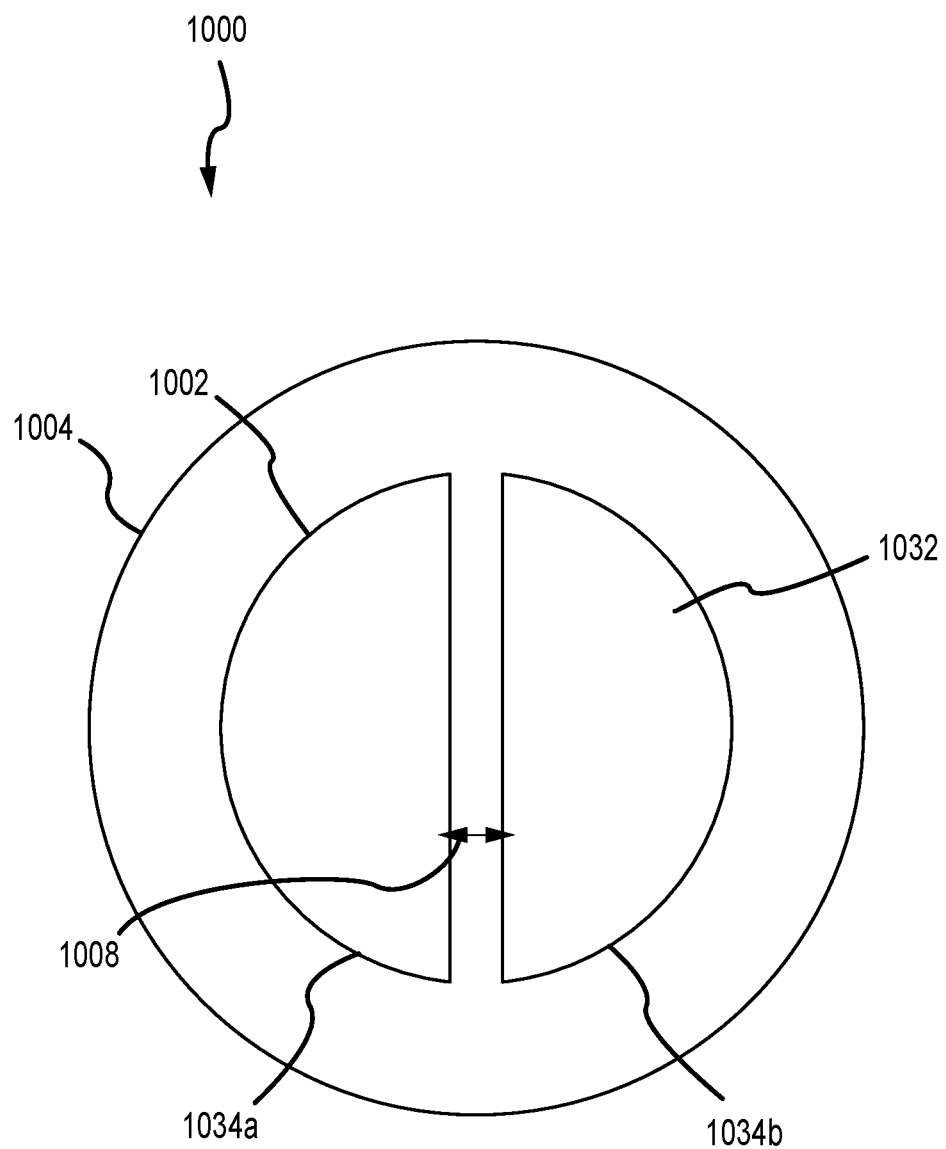
FIG. 10 depicts a vibrating meter 1000, in accordance with an embodiment.

In further embodiments, the vibrating element may comprise a first tine, and the boundary element may comprise a second tine. For example, FIG. 10 depicts vibrating meter 1000. Vibrating meter 1000 is similar to vibrating meter 200, except that it includes a housing 1004 that is proportionally much larger than the perimeter of the vibrating element 1002 that it surrounds. For this reason, the mean displacement velocity of the fluid between the housing 1004 and the vibrating element 1002 is not significantly affected by the movement of fluid between the housing 1004 and the vibrating element 1002.

Vibrating meter 1000 instead includes a first tine 1034a that acts as a vibrating element 1002, along with a second tine 1034b that acts as a boundary element 1032, defining a gap 1008 that may increase the mean displacement velocity of fluid. Vibrating meter 1000 may therefore have increased density and viscosity sensitivity for similar reasons as those described with respect to vibrating meters 200 and 700 above.

In embodiments, the vibrating element may comprise a cylinder. For example, the vibrating element may comprise a cylinder resonator such as the one depicted in FIG. 4A. In further embodiments, the vibrating element may comprise a planar resonator. For example, FIGS. 5A and 5B depict an example planar resonator 550.

In embodiments, a density sensitivity of the vibrating meter may be greater than 1400 ns/kg/m3 when the fluid being measured is a gas.

In embodiments, the viscosity sensitivity may be greater than $1.949 \times 10^{-7}$ µPa·s when the fluid is a gas, as described above.

Figure 11:
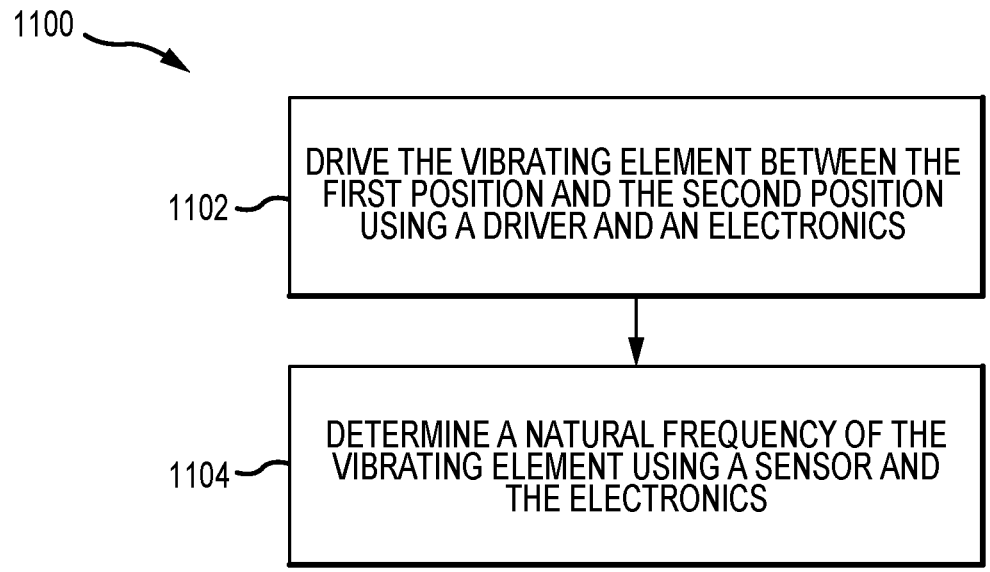
FIG. 11 depicts method 1100, in accordance with an embodiment.

FIG. 11 depicts a method 1100 in accordance with an embodiment. Method 1100 begins with step 1102. In step 1102, the vibrating element is driven between the first position and the second position using a driver and an electronics. For example, vibrating element 202 is driven between a first position 302 and a second position 304 using a driver and an electronics, as described above with respect to vibrating meter 200.

Method 1100 continues with step 1104. In step 1104, a natural frequency ω of the vibrating element is determined using a sensor and the electronics. For example, the natural frequency ω of the vibrating element 202 may be determined using a sensor and the electronics, as described above with respect to vibrating meter 200.

Figure 12:
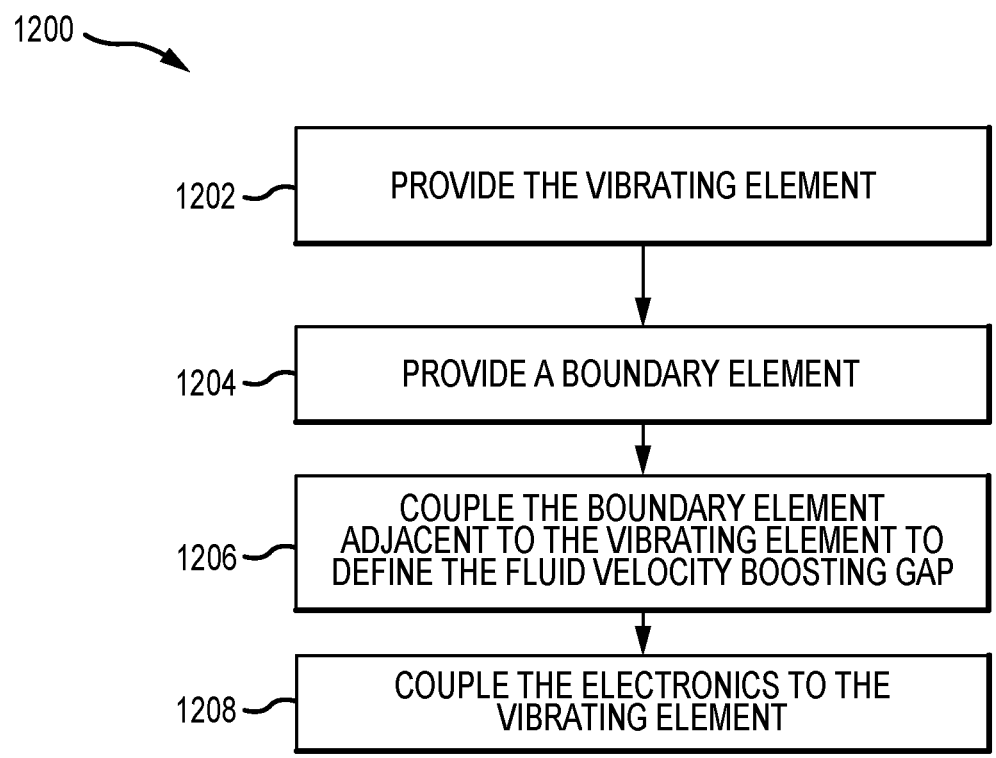
FIG. 12 depicts method 1200, in accordance with an embodiment.

FIG. 12 depicts a method 1200 in accordance with an embodiment. Method 1200 begins with step 1202. In step 1202, the vibrating element is provided. For example, vibrating elements 202, 402, 502, 702, 1002 may be provided, as described above.

Method 1200 continues with step 1204. In step 1204, the boundary element is provided. For example, boundary elements 232, 432, 532, 732, 1032 may be provided, as described above.

Method 1200 continues with step 1206. In step 1206, the boundary element is coupled adjacent to the vibrating element to define the gap. For example, boundary element 232, 432, 532, 732, 1032 may be coupled to vibrating element 202, 402, 502, 702, 1002 to define fluid velocity boosting gap 308, 408, 508, 754, 1008, as described above.

Method 1200 continues with step 1208. In step 1208, the electronics are coupled to the vibrating meter. For example, electronics 118 may be coupled to vibrating meter 200, 400, 500, 700, 1000, as described above.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein may be applied to other vibrating meters, and not just to the embodiments described above and shown in the accompanying figures. Accordingly, the scope of the embodiments described above should be determined from the following claims.

I claim:

1. A vibrating meter comprising:
   a vibrating element comprising a longitudinal direction and a cross-sectional area in a plane perpendicular to the longitudinal direction, the vibrating element moving between a first position and a second position in the plane perpendicular to the longitudinal direction;

a boundary element adjacent to the vibrating element; and
an electronics operable to drive the vibrating element between the first position and the second position;
wherein the boundary element and the vibrating element define a fluid velocity boosting gap in the plane perpendicular to the longitudinal direction, the fluid velocity boosting gap having an average gap distance between the boundary element and the vibrating element when the vibrating element is in a neutral position, the average gap distance being between 0.1 mm and 0.25 mm.

2. A vibrating meter as claimed in claim 1, further comprising:
wherein the vibrating element has a gap-facing perimeter section in the cross-sectional area of the plane facing the fluid velocity boosting gap, the gap-facing perimeter section having a gap perimeter length, and a ratio of the gap perimeter length to the average gap distance that is at least 160.

3. A vibrating meter as claimed in claim 1, wherein the average gap distance is 0.2 mm or less.

4. A vibrating meter as claimed in claim 1, wherein the vibrating element is a first tine and the boundary element is a housing.

5. A vibrating meter as claimed in claim 1, wherein the vibrating element is a first tine and the boundary element is a second tine.

6. A vibrating meter (400) as claimed in claim 1, wherein the vibrating element is a cylinder.

7. A vibrating meter as claimed in claim 1, wherein the vibrating element is a planar resonator.

8. A vibrating meter as claimed in claim 1, wherein a density sensitivity of the vibrating meter is greater than 1400 ns/kg/m3 when the fluid is a gas.

9. A vibrating meter as claimed in claim 1, wherein a viscosity sensitivity is greater than $1.949 \times 10^{-7}$ μPa when the fluid is a gas.

10. A method of determining a viscosity or a density of a fluid using a vibrating meter comprising a vibrating element comprising a longitudinal direction and a cross-sectional area in a plane perpendicular to the longitudinal direction, the vibrating element moving between a first position and a second position in the plane perpendicular to the longitudinal direction, a boundary element adjacent to the vibrating element, and an electronics operable to drive the vibrating element between the first position and the second position, wherein the boundary element and the vibrating element define a fluid velocity boosting gap in the plane perpendicular to the longitudinal direction, the fluid velocity boosting gap having an average gap distance between the boundary element and the vibrating element when the vibrating element is in a neutral position, the average gap distance being between 0.1 mm and 0.25 mm, the method comprising:
driving the vibrating element between the first position and the second position using a driver and the electronics; and
determining a natural frequency of the vibrating element using a sensor and the electronics.

11. A method as claimed in claim 10, wherein the average gap distance is 0.2 mm or less.

12. A method as claimed in claim 10, wherein the vibrating element is a first tine and the boundary element is a housing.

13. A method as claimed in claim 10, wherein the vibrating element is a first tine and the boundary element is a second tine.

14. A method as claimed in claim 10, wherein the vibrating element is a cylinder.

15. A method as claimed in claim 10, wherein the vibrating element is a planar resonator.

16. A method as claimed in claim 10, wherein a density sensitivity of the vibrating meter is greater than 1400 ns/kg/m3 when the fluid is a gas.

17. A method as claimed in claim 10, wherein a viscosity sensitivity is greater than $1.949 \times 10^{-7}$ μPa when the fluid is a gas.

18. A method as claimed in claim 10, wherein a driving frequency at which the vibrating element is driven between the first position and the second position is below 600 Hz.

19. A method for assembling the vibrating meter comprising a vibrating element comprising a longitudinal direction and a cross-sectional area in a plane perpendicular to the longitudinal direction, the vibrating element moving between a first position and a second position in the plane perpendicular to the longitudinal direction, a boundary element adjacent to the vibrating element, and an electronics operable to drive the vibrating element between the first position and the second position, wherein the boundary element and the vibrating element define a fluid velocity boosting gap in the plane perpendicular to the longitudinal direction, the fluid velocity boosting gap having an average gap distance between the boundary element and the vibrating element when the vibrating element is in a neutral position, the average gap distance being between 0.1 mm and 0.25 mm, the method comprising:
providing the vibrating element;
providing the boundary element;
coupling the boundary element adjacent to the vibrating element to define the fluid velocity boosting gap; and
coupling the electronics to the vibrating meter.

20. A method as claimed in claim 19, wherein the average gap distance is 0.2 mm or less.

21. A method as claimed in claim 19, wherein the vibrating element is a first tine and the boundary element is a housing.

22. A method as claimed in claim 19, wherein the vibrating element is a first tine and the boundary element is a second tine.

23. A method as claimed in claim 19, wherein the vibrating element is a cylinder.

24. A method as claimed in claim 19, wherein the vibrating element is a planar resonator.

25. A method as claimed in claim 19, wherein a density sensitivity of the vibrating meter is greater than 1400 ns/kg/m3 when the fluid is a gas.

26. A method as claimed in claim 19, wherein a viscosity sensitivity is greater than $1.949 \times 10^{-7}$ μPa when the fluid is a gas.

* * * * *